US006537674B1

(12) United States Patent
Hamahara et al.

(10) Patent No.: US 6,537,674 B1

(45) Date of Patent: Mar. 25, 2003

(54) SURFACE TREATED STEEL SHEET

(75) Inventors: Kyoko Hamahara, Chiba (JP); Hisatada Nakakoji, Chiba (JP); Kazuo Mochizuki, Chiba (JP)

(73) Assignee: Kawasaki Steel Corporation, Hyogo (JP)

( * ) Notice: Subject to any disclaimer, the term of this patent is extended or adjusted under 35 U.S.C. 154(b) by 0 days.

(21) Appl. No.: 09/830,289

(22) PCT Filed: Aug. 24, 2000

(86) PCT No.: PCT/JP00/05710

§ 371 (c)(1),
(2), (4) Date: Apr. 25, 2001

(87) PCT Pub. No.: WO01/15894

PCT Pub. Date: Mar. 8, 2001

(30) Foreign Application Priority Data

Aug. 26, 1999 (JP) .......................................... 11-239732

(51) Int. Cl.[7] ................................................ B32B 9/04

(52) U.S. Cl. ....................... 428/447; 428/450; 428/615; 106/14.05

(58) Field of Search ................................ 428/544, 615, 428/446, 447, 450; 106/14.05

(56) References Cited

U.S. PATENT DOCUMENTS 5,152,849 A * 10/1992 Bittner et al. ............... 148/262
5,855,695 A * 1/1999 McMillen et al. ....... 106/14.44
6,248,182 B1 * 6/2001 Ding et al. ................. 148/251

* cited by examiner

*Primary Examiner*—Robert Dawson
*Assistant Examiner*—Michael J Feely
(74) *Attorney, Agent, or Firm*—Young & Thompson

(57) ABSTRACT

The coated steel sheet is a zinc-based plated steel sheet which has a zinc phosphate-based coating containing magnesium thereon and a silicone resin coating containing a functional group which reacts with an organic substance on the surface of the zinc phosphate-based coating. The coated steel sheet has superior perforative corrosion resistance, paint adhesion, electrodesposition paintability, press formability, and weldability without using chromium and therefore is useful as an anti-corrosive steel sheet for automobile bodies.

6 Claims, 4 Drawing Sheets

10μm

10μm

10μm

10μm

SURFACE TREATED STEEL SHEET

TECHNICAL FIELD

The present invention relates to coated steel sheets intended for use mainly as steel sheets as automobile bodies, and more particularly to coated steel sheets having superior perforative corrosion resistance, paint adhesion, electrodeposition paintability, press formability, and weldability.

BACKGROUND ART

Steel sheets with zinc-based plating are widely used as automobile bodies in order to prevent the strength of automobile bodies from decreasing due to use in a corrosive environment for a long time, and mainly zinc-alloy plated steel sheets such as zinc-nickel-alloy plated steel sheets and zinc-iron-alloy plated steel sheets are used in Japan.

Although zinc-based alloy plating can impart high corrosion resistance to steel sheets by alloying nickel or iron with zinc, it has several problems attributable to being alloy plating.

For example, zinc-nickel alloy plated steel sheets are manufactured by electrogalvanizing and the cost is high because nickel is expensive. Furthermore, the nickel content should be normally adjusted in an extremely narrow range (for example, 12±1 mass %), which makes its manufacture difficult.

On the other hand, zinc-iron-alloy steel sheets can be produced by either electrogalvanizing or hot-dip galvanizing.

However, when zinc-iron-alloy plated steel sheets are manufactured by electrogalvanizing, it entails difficulty in alloy control, i.e. adjusting the iron content in the zinc plating layer in an extremely narrow range, similar to zinc-nickel alloy plated steel sheets. In addition, $Fe^{2+}$ ions in the plating solution are prone to be oxidized, which destabilizes plating and makes the manufacture difficult. As a result, the cost is high.

Generally, zinc-iron-alloy plated steel sheets are often manufactured by hot-dip galvanizing. When zinc-iron-alloy plated steel sheets are manufactured by hot-dip galvanizing, molten zinc is allowed to adhere to the surface of steel sheets, which are kept at a high temperature to alloy the steel sheets and zinc. However, the quality of plating produced by this method is susceptible to the Al concentration in molten zinc plating baths and to the temperature and duration of the alloying process, and an advanced technology is necessary to manufacture uniform alloy plating layers. As a result, the cost is high also in this case.

As mentioned above, zinc-based-alloy plating has problems that any form of them is difficult to manufacture and the cost is high.

On the other hand, galvanized steel sheets, which have only zinc plating, are less expensive and can be manufactured by either electrogalvanizing or hot-dip galvanizing. However, they are rarely used as automobile bodies. The reason is that zinc plating alone cannot provide enough corrosion resistance, especially when galvanized steel sheets are exposed to a corrosive environment for a long time, the steel sheets tend to develop perforation by corrosion, which causes a problem in terms of guarantee of the strength of automobile bodies. Furthermore, galvanized steel sheets have problems that a quantity of zinc tends to deposit on electrodes in spot welding, which shortens the life of electrodes, and the plates have poor press formability.

Generally, in manufacturing automobile bodies, steel sheets or plated steel sheets are subjected to press forming and welding, and are subjected to a chemical conversion treatment, electrodeposition painting, and spray painting in succession before being used as automobile bodies. It is said the lower parts of doors are most likely to develop perforation by corrosion. The reasons are that steel sheets are folded at the lower parts of doors, and water entering through slits of windows etc. pools in the folded parts, which accelerates the corrosion compared to the other parts of automobile bodies.

Among the treatments applied after the press forming of bodies, the chemical conversion treatment and the electroplating can be applied to the inner surface of doors, but in the spray painting, which is conducted afterwards, the paint cannot reach the inner surface. Therefore, the anti-corrosive effect of the spray painting cannot be expected to be obtained, and corrosion resistance after the electrodeposition painting is important. Among the parts in the door, the folded part (a hem structure) at the lower end of the door that is exposed to the harshest environment does not receive electrodeposition painting and is exposed to the corrosive environment without the protection of electrodeposition painting. Therefore, perforative corrosion resistance is important in both cases where no electrodeposition painting is conducted (no coating) and only electrodeposition painting is conducted (after electrodeposition painting).

With this situation as a background, a technology in which a coating containing magnesium is formed on zinc plating is disclosed as a method of improving corrosion resistance of galvanized steel sheets. For example, Japanese Unexamined Patent Application Publication No. 1-312081 discloses coated metal materials wherein a phosphate coating containing 0.1 mass % or more of magnesium is formed on an electrogalvanized layer.

However, although the coated metal materials which have a phosphate coating containing only magnesium as described in the above-mentioned publication are resistant to rust formation in a salt spray corrosion test, they have insufficient perforative corrosion resistance in a composite cycle corrosion resistance test, which yields similar results to the actual corrosion in automobile bodies.

Furthermore, as surface-treated steel sheets with improved corrosion resistance, there may be mentioned an organic composite coated steel sheet comprising a chromate layer and an organic coating layer containing silica are formed on a zinc-nickel alloy electroplated steel sheet with a coating weight of 20 to 30 $g/m^2$, a zinc hot-dip galvanized steel sheet with a heavy coating weight of 60 $g/m^2$, and an electrogalvanized steel sheet with a heavy coating weight of 60 $g/m^2$. These surface-treated steel sheets have sufficient corrosion resistance with insufficient electrodeposition painting, which is applied after assembly of automobile bodies, and therefore contribute to prolonged lives of automobiles.

However, the above-mentioned organic composite coated steel sheet has a chromate layer, and if chromium is emitted, it has a great impact on the environment. Therefore, extremely strict wastewater treatment is necessary when the steel sheet is used, which increases the cost.

On the other hand, the heavy coated zinc hot-dip galvanized steel sheet in which chromium is not used has several quality problems, namely, it has poor press formability, and it tends to develop craters during electrodeposition painting and has poor electrodeposition paintability. Furthermore, the heavy coated electrogalvanized steel sheet has poor press formability similar to the thick-coated zinc hot-dip galvanized steel sheet and is too expensive in Japan, where the electricity costs are high. In short, when a steel sheet has a chromate layer which greatly contributes to perforative corrosion resistance, the base plating layer can be thin but it requires measures for environmental protection. On the other hand, when a steel sheet has no chromate layer, the plating layer needs to be thick, which makes the steel sheet inferior in press formability and electrodeposition paintability.

In this connection, a technology to improve perforative corrosion resistance and paint adhesion without increasing the thickness of the plating layer is required. Japanese Unexamined Patent Application Publication No. 52-80239 and Japanese Unexamined Patent Application Publication No. 63-219587 disclose such technologies.

Japanese Unexamined Patent Application Publication No. 52-80239 describes a technology in which a steel sheet or galvanized steel sheet with a coating weight of 10 $g/m^2$ or less is subjected to an iron-based or zinc-based phosphate treatment and is then subjected to a sealing treatment with a silane coupling agent for the purpose of improving paint adhesion. Japanese Unexamined Patent Application Publication No. 63-219587 describes a technology in which a sealing treatment with a silane coupling agent is conducted after a zinc phosphate treatment.

However, no consideration for use as automobile bodies, especially for the recent stringent requirement for corrosion resistance, is given to the coated steel sheets described in the above-mentioned patent application publications. Namely, because the coating weight of zinc is low, sacrificial corrosion prevention by zinc toward iron cannot be exerted for a long time even when the sealing treatment with a silane coupling agent is conducted. Therefore these steel sheets develop corrosion of iron at an early stage, and have poor perforative corrosion resistance.

A silane coupling agent has a functional group which reacts with an inorganic substance (a methoxy group, an ethoxy group, a cellosolve group) and a functional group which reacts with an organic material (a vinyl group, an epoxy group, an amino group, a mercapto group) in a molecule and contributes to adhesion between a metal and an organic paint coating. Therefore, when a steel sheet treated with a silane coupling agent is directly coated with paint, paint adhesion and corrosion resistance after painting are good. However, the silane coupling agent has a shortcoming in that it is dissolved in the chemical conversion treatment because of poor alkali resistance.

In automobile manufacturers, a material is generally subjected to a blanking treatment, then to press forming, and to the chemical conversion treatment. When a large amount of silane coupling agent is dissolved during the chemical conversion treatment, it is natural that sufficient paint adhesion cannot be ensured. In addition, there is a disadvantage in that perforative corrosion resistance cannot be ensured in parts where electrodeposition painting is not sufficiently applied after assembly of automobile bodies.

Incidentally, Japanese Unexamined Patent Application Publication No. 52-80239 discloses evaluation results for a steel sheet which is coated with paint without the chemical conversion treatment after the sealing treatment with the silane coupling agent. Japanese Unexamined Patent Application Publication No. 63-219587 also describes applying paint without the chemical conversion treatment for automobiles.

In particular, the technology described in Japanese Unexamined Patent Application Publication No. 63-219587 involves replacing a phosphate treatment in the automobile manufacturing line with a special phosphate treatment and conducting a sealing treatment with a silane coupling agent in the subsequent treatment step. Therefore, it does not provide a material intended to be subject to blanking, press forming, a chemical conversion treatment, and subsequent various treatments as a material normally used for automobiles. Furthermore, this patent application publication shows corrosion resistance after painting but does not evaluate corrosion resistance in parts without sufficient electrodeposition painting, i.e. perforative corrosion resistance with no paint.

Furthermore, Japanese Unexamined Patent Application Publication No. 59-219478 discloses a treatment agent containing an organoalkoxysilane compound as an aqueous after-treatment agent for metal surfaces subjected to a chemical conversion treatment. Nevertheless, it is difficult for this technology to provide a material intended to be subjected to steps in automobile manufacturers including blanking, press forming, a chemical conversion treatment, and various subsequent treatments as a material normally used for automobiles.

Moreover, Japanese Unexamined Patent Application Publication No. 63-102929 discloses an organic coated steel sheet in which a coating of a ladder-type silicone resin is formed on a chemical-conversion-treated coating. The ladder-type silicone resin as used here is a silicone resin in which siloxane bonds (—Si—O—Si—) form a network structure as below.

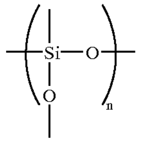

Therefore, the ladder-type silicone resin has superior barrier properties and is effective for improvement of perforative corrosion resistance. However, the resin cannot follow the transformation of the material in forming and, on the contrary, restrains the transformation of the material, which makes the material prone to crack. Therefore, the technology has a disadvantage that satisfactory press formability cannot be obtained.

Accordingly, it is an object of the present invention to provide a coated steel sheet having superior perforative corrosion resistance, paint adhesion, electrodeposition paintability, press formability and weldability which is advantageously adopted as an anti-corrosive steel sheet for automobile bodies, especially without using chromium.

DISCLOSURE OF INVENTION

The inventors have intensively investigated how to solve the problems in the conventional art and have invented a surface-treated steel sheet with improved perforative corrosion resistance with no paint and improved paint adhesion, electrodeposition paintability, press formability and weldability.

Accordingly, the inventors have invented a coated steel sheet of a zinc plated steel sheet which has a zinc phosphate-based coating containing magnesium on the surface and a silicone resin coating which has a functional group which reacts with an organic substance on the surface of the zinc phosphate-based coating.

In the coated steel sheet, it is preferred that the zinc phosphate-based coating further contain nickel and manganese because pitting resistance after electrodeposition painting is better in that case. Furthermore, the contents of magnesium, nickel, and manganese in the zinc phosphate-based coating were optimized to reveal that it is preferred that the zinc phosphate-based coating contain 0.5 to 10.0 mass % of magnesium, 0.1 to 2.0 mass % of nickel, and 0.5 to 8.0 mass % of manganese and the manganese and nickel content satisfy the following formula (1), to drastically improve perforative resistance after electrodeposition painting.

$$[Ni]\times 7.6-10.9 \leqq [Mn] \leqq [Ni]\times 11.4 \quad (1)$$

wherein [Mn] represents the mass % of manganese and [Ni] represents the mass % of nickel.

In addition, the inventors have also found that both perforative corrosion resistance and press formability are improved if the contents of magnesium, nickel, and manganese in the above-mentioned zinc phosphate-based coating are regulated in a specific narrower range, i.e., the above-mentioned zinc phosphate-based coating contains 2.0 to 7.0 mass % of magnesium, 0.1 to 1.4 mass % of nickel, and 0.5 to 5.0 mass % of manganese. The inventors have also found that especially press formability of this coated steel sheet are further improved when zinc phosphate is a granular crystal with a longer side below 2.5 $\mu$m in the above-mentioned zinc phosphate-based coating.

The inventors have also found especially press formability are further improved when the silicone resin coating further contains an oxidized polyethylene in all the above-mentioned coated steel sheets.

The present invention has been made based on the above-mentioned findings and it has been made clear that the amount of plating can be reduced without using chromium according to the present invention.

BEST MODE FOR CARRYING OUT THE INVENTION

Figure 1:
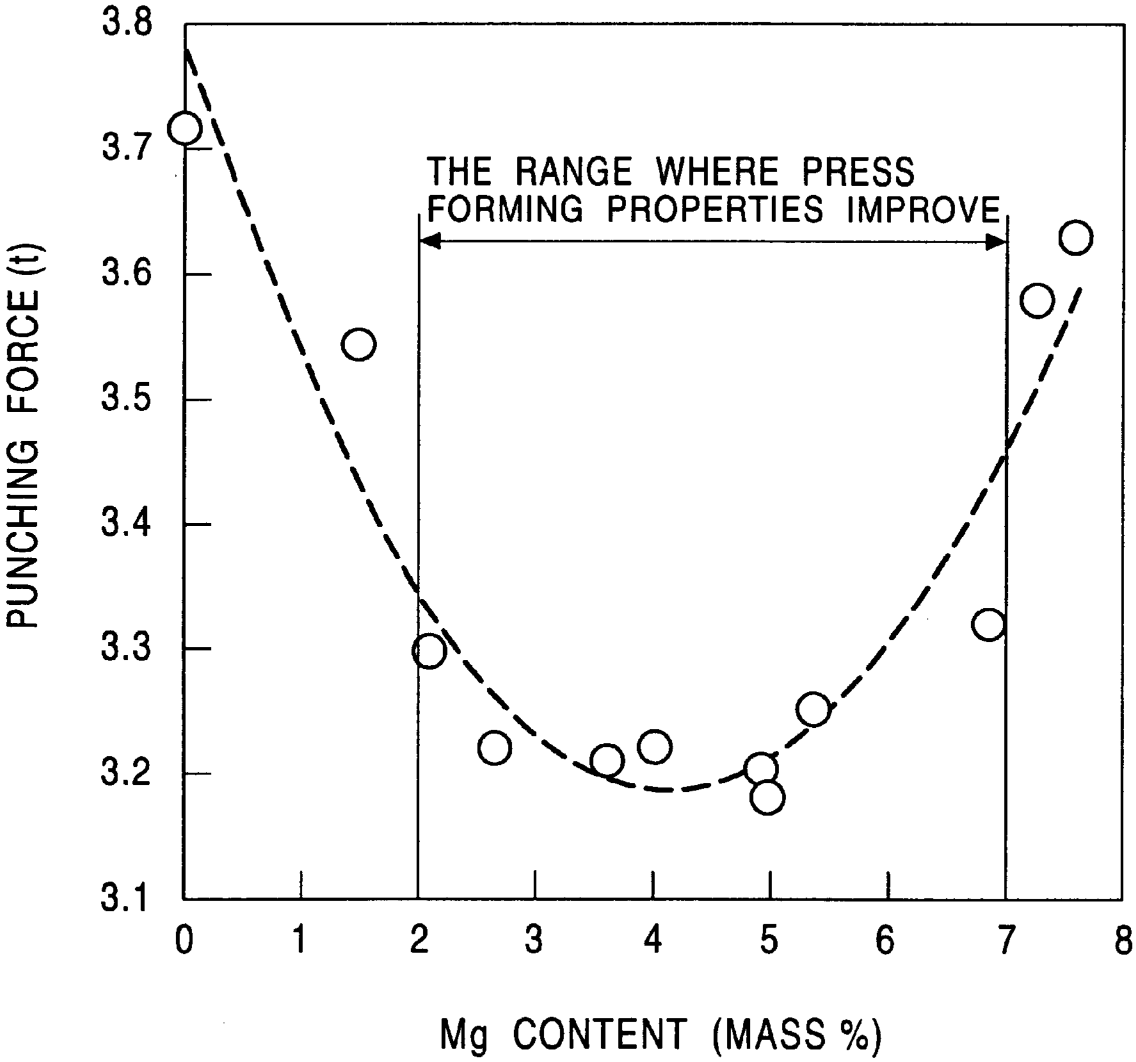
FIG. 1 shows a plot of the results of punching force versus the magnesium content in the zinc phosphate-based coating in swift cup tests for various steel sheets with different magnesium contents in the zinc phosphate-based coating.
Figure 2A:
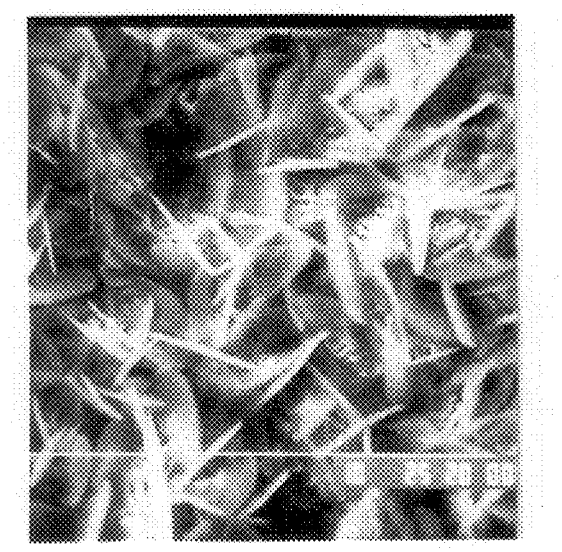
FIGS. 2(*a*) to (*d*) each shows a SEM image of the surface of the zinc phosphate-based coating on zinc-based plated steel sheets with different magnesium, nickel, and manganese contents in the zinc phosphate-based coating.
Figure 2B:
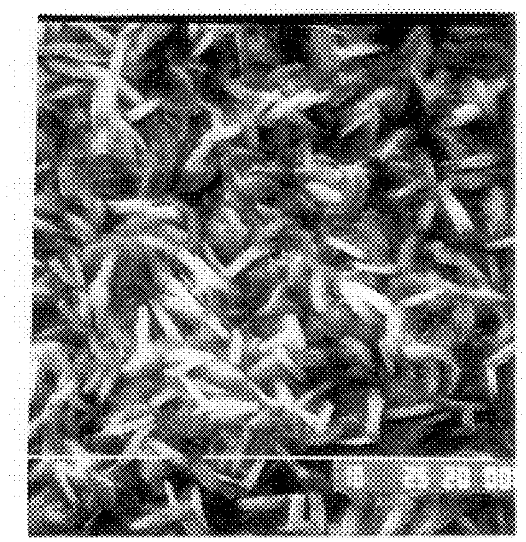
Figure 2C:
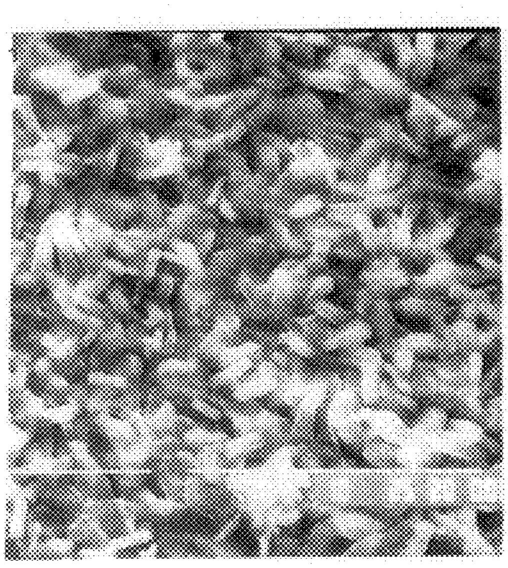
Figure 2D:
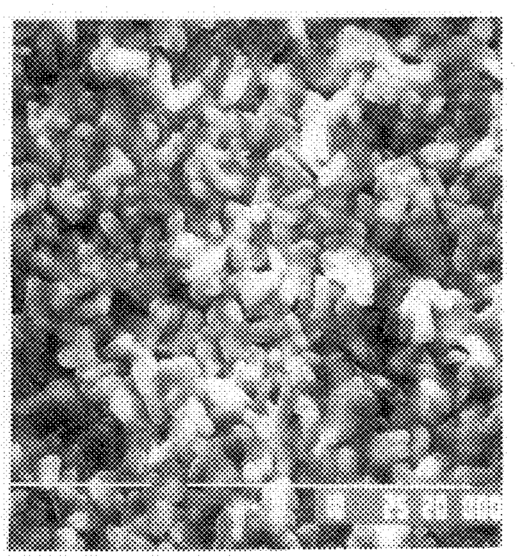

As a material for surface-treated steel sheets of the present invention, zinc or zinc-based-alloy plated steel sheets are used. Among them, pure zinc plating is recommended because it is less expensive and versatile.

Zinc-based plating layer which forms zinc-based plated steel sheets can be produced by known electrogalvanizing or hot-dip galvanizing. The coating weight is not specifically limited. However, the coating weight is preferably in the range of 20 to 60 g/m$^2$ per side in view of perforative corrosion resistance, press formability, and weldability. Coating a large amount of zinc is wasteful.

Incidentally, because the zinc-based plating coating produced by each plating method normally contains Sn, Ni, Fe, Al and the like as inevitable impurities in the coating, the present invention is also directed to the zinc-based plating coating which inevitably contains these impurities, in which case the content of each inevitable impurity is preferably 1 mass % or less in the zinc-based plating coating.

The coated steel sheet of the present invention has a zinc phosphate-based coating which contains magnesium as the second layer on the surface of the above-mentioned zinc-based plated steel sheet, and a silicone resin coating which contains a functional group which reacts with an organic substance as the third layer on the surface of the zinc phosphate-based coating. This improves perforative corrosion resistance in unpainted portions and press formability.

The reason for improvement in press formability is that the zinc phosphate-based coating reduces the friction between metal surfaces (the zinc plating and a die), and the coating retains a lubricant and acts as a buffer between metals to minimize the damage of the zinc-based plated coating by friction.

It is believed that the reason for improvement in perforative corrosion resistance in unpainted portions is that the oxide of magnesium passivates zinc, thereby retarding the dissolution of zinc in a corrosive environment when the zinc phosphate-based coating contains magnesium.

Furthermore, perforative corrosion resistance after electrodeposition painting is also improved when the zinc phosphate-based coating which contains magnesium further contains nickel and manganese.

In particular, perforative corrosion resistance after electrodeposition painting can be drastically improved when the contents of magnesium, nickel, and manganese in the zinc phosphate-based coating are adjusted to 0.5 to 10.0 mass % of magnesium, 0.1 to 2.0 mass % of nickel, and 0.5 to 8.0 mass % of manganese and the manganese and nickel content satisfy the following formula (1):

$$[Ni]\times 7.6-10.9 \leqq [Mn] \leqq [Ni]\times 11.4 \quad (1)$$

wherein [Mn] represents the mass % of manganese and [Ni] represents the mass % of nickel.

The details on the limitation of the components in the zinc phosphate-based coating in the above-mentioned suitable range will be next described.

In a manufacturing process of automobiles, a body assembled by welding after press forming is generally subjected to a chemical conversion treatment, electrodeposition painting, and then spray painting. Portions prone to be perforated by corrosion (for example, the inside of doors) receive electrodeposition painting but do not receive spray painting. Therefore, perforative corrosion resistance is important when only electrodeposition painting is conducted without spray painting.

When zinc-based plated steel sheets subjected to the chemical conversion treatment and the above-mentioned painting in succession are exposed to a corrosive environment, moisture contained in the corrosive environment condenses in the chemical conversion treatment coating (a phenomenon in which the coating has adsorbed water or bonding water), which causes blistering of the coating. As a result, corrosion tends to be accelerated.

In this connection, nickel and manganese are generally incorporated in the chemical conversion treatment (zinc phosphate) coating to prevent moisture condensation and improve perforative corrosion resistance after electrodeposition painting for zinc-based plated steel sheets for automobiles.

It is known that perforative corrosion resistance is improved when the zinc phosphate-based coating contains magnesium.

The inventors have thought incorporation of magnesium, nickel, and manganese in the zinc phosphate-based coating would improve corrosion resistance after electrodeposition painting, especially perforative corrosion resistance by a combined effect of corrosion resistance caused by magnesium and prevention of paint blistering by nickel and manganese and intensively investigated a possibility of incorporating the three elements in the zinc phosphate-based coating.

As a result, it was impossible to incorporate appropriate amounts of nickel and manganese in the zinc phosphate-based coating which contains a predetermined amount or more of magnesium. On the other hand, it was also impossible to incorporate an appropriate amounts of magnesium in the zinc phosphate-based coating which contains predetermined amounts or more of nickel and manganese. In both cases, it was found that it is difficult to incorporate appropriate amounts of both magnesium, and nickel and manganese in the zinc phosphate-based coating.

The inventors have proceeded to investigate a method to incorporate appropriate amounts of magnesium, and nickel and manganese in the zinc phosphate-based coating. As a result, the inventors have succeeded in incorporating nickel and manganese in amounts which can obtain a paint blistering prevention effect and improved corrosion resistance by adjusting the magnesium content to 0.5 to 10.0 mass %. In addition, the inventors have found that, in particular, perforative corrosion resistance after electrodeposition painting is improved by optimizing the nickel and manganese content.

Figure 3:
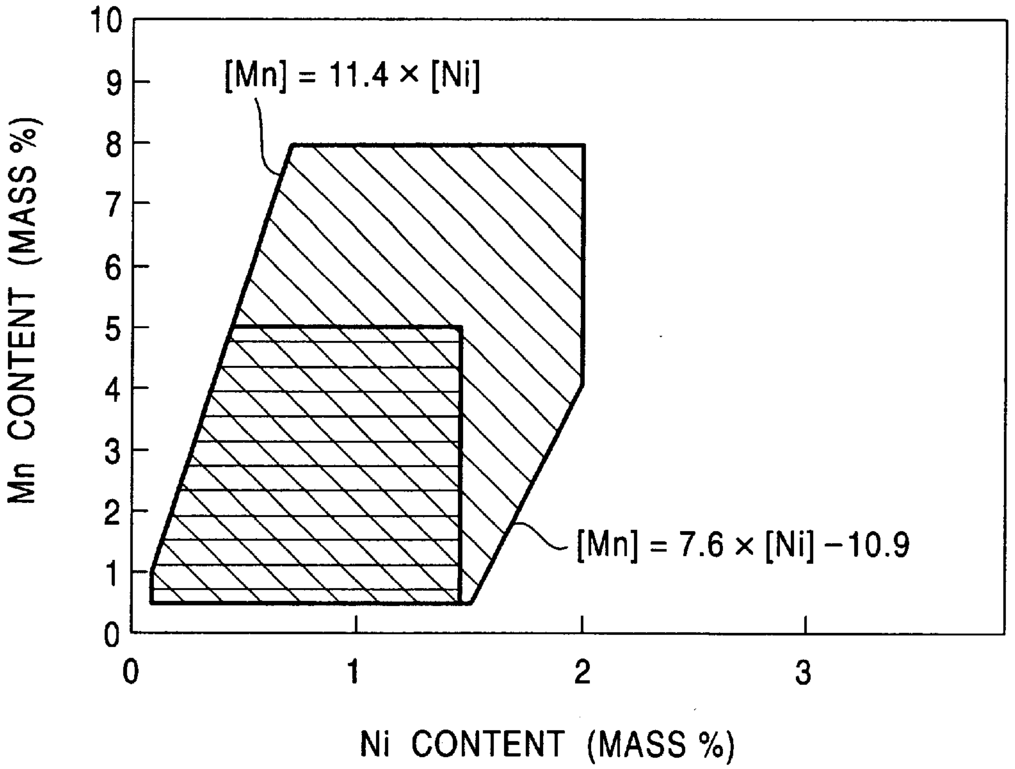
FIG. 3 is a graph which shows the preferred and more preferred ranges of the contents of manganese and nickel in the zinc phosphate-based coating formed on zinc-based plated steel sheets according to the present invention.

Accordingly, it is preferred in the present invention that the magnesium, nickel, and manganese content in the zinc phosphate-based coating be adjusted to 0.5 to 10.0 mass % of magnesium, 0.1 to 2.0 mass % of nickel, and 0.5 to 8.0 mass % of manganese and the nickel and manganese content satisfy the formula: $[Ni]\times 7.6-10.9 \leqq [Mn] \leqq [Ni]\times 11.4$. Namely, it is preferred that the magnesium content be adjusted to 0.5 to 10.0 mass % and the nickel and manganese content be adjusted in the range shown by the diagonally shaded area in FIG. 3.

The suitable magnesium content is set at 0.5 to 10.0 mass % in the zinc phosphate-based coating because enough perforative corrosion resistance can be obtained and prevention of paint blistering by nickel and manganese can be also exerted.

Furthermore, it is preferred in the present invention that nickel and manganese be incorporated in the zinc phosphate-based coating in amounts of 0.1 to 2.0 mass % and 0.5 to 8.0 mass %, respectively and the nickel and manganese content satisfy the formula: $[Ni]\times 7.6-10.9 \leqq [Mn] \leqq [Ni]\times 11.4$. Namely, the nickel and manganese content are preferably in the appropriate range shown in FIG. 3 because it is extremely easy to incorporate magnesium in the zinc phosphate-based coating at 0.5 mass % or more, which is the lower limit of the above-mentioned range of content, and enough perforative corrosion resistance is obtained with such nickel and manganese content.

Furthermore, when the mass percent of manganese is $\{[Ni]\times 7.6-10.9\}$ or more and $\{[Ni]\times 11.4\}$ or less, it is extremely easy to incorporate magnesium in the zinc phosphate-based coating at 0.5 mass % or more and enough perforative corrosion resistance is obtained.

In the present invention, it is preferred that the magnesium content be limited to 2.0 to 7.0 mass %, and the nickel and manganese content be limited 0.1 to 1.4 mass % and 0.5 to 5.0 mass %, respectively and the nickel and manganese content be limited in the range that satisfies $[Ni]\times 7.6-10.9 \leqq [Mn] \leqq [Ni]\times 11.4$ in the zinc phosphate-based coating, in order to improve press formability as well as perforative corrosion resistance. Namely, it is preferred that the magnesium content be limited to 2.0 to 7.0 mass % and at the same time the nickel and manganese content be limited in the range shown as an overlap of diagonally shaded and horizontally shaded areas in FIG. 3.

A more suitable magnesium content is limited to 2.0 to 7.0 mass % in the zinc phosphate-based coating because zinc phosphate tends to become a granular crystal with a longer side as short as below 2.5 μm and press formability are drastically improved with such a content. The reason is not clear but it is believed that granular and fine zinc phosphate crystal can reduce sliding frictional resistance when the steel sheet is contacted with a die in press forming.

Incidentally, when the magnesium content is below 2.0 mass %, zinc phosphate crystals becomes scaly (see FIGS. 2(*a*) and (*b*)) and the size of the crystals (the longer side) is 2.5 μm or more and press formability are not improved sufficiently. On the other hand, when the magnesium content exceeds 7.0 mass %, the zinc phosphate crystals becomes brittle and press formability are not improved sufficiently.

The inventors have prototyped various galvanized steel sheets with different magnesium contents in the zinc phosphate-based coating to evaluate press formability. Specifically, circular samples with a blank diameter of 100 mm were punched out of these galvanized steel sheets, and the samples were subjected to a press forming test under the conditions of punch diameter of 50 mm, die diameter of 52 mm, blank holding pressure of 1 ton (9806 N) and punch speed of 120 mm/min. The results are shown in FIG. 1. The ordinate shows the punching force (t) in the press forming and the abscissa shows the magnesium content in the zinc phosphate-based coating (mass %) and the graph shows that the smaller the punching force, the more excellent the press formability.

FIG. 2 shows an SEM image of the surface of the zinc phosphate-based coating on four zinc-based plated steel sheets with different magnesium content in the zinc phosphate-based coating. FIG. 2(*a*) corresponds to an Mg content of 0 mass %, an Ni content of 1.3 mass %, and an Mn content of 1.9 mass %. FIG. 2(*b*) corresponds to an Mg content of 1.1 mass %, an Ni content of 1.3 mass %, and an Mn content of 1.6 mass %. FIG. 2(*c*) corresponds to an Mg content of 2.1 mass %, an Ni content of 0.7 mass %, and an Mn content of 1.3 mass %. FIG. 2(*d*) corresponds to an Mg content of 4.0 mass %, an Ni content of 0.3 mass %, and an Mn content of 1.0 mass %.

It is shown in FIG. 1 and FIG. 2, when the magnesium content is limited in the range of 2.0 to 7.0 mass %, the size (the longer side) of zinc phosphate crystal is below 2.5 μm (see FIGS. 2(*c*) and (*d*)) and press forming properties are drastically improved.

Figure 4:
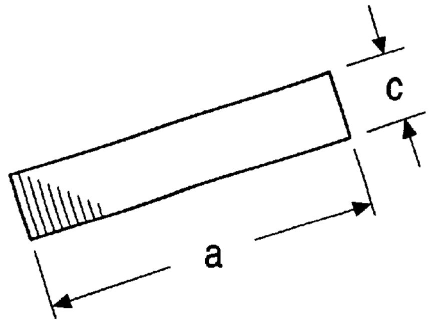
FIG. 4 is a picture which illustrates a granular zinc phosphate crystal formed on the zinc-based plated steel sheets of the present invention.

The term 'granular' used herein refers to an object with a ratio of shorter side c to longer side a exceeding 0.2 when a crystal observed in the SEM image is shown as in FIG. 4.

Therefore, the magnesium content is preferably limited in the range of 2.0 to 7.0 mass % when it is required to further improve the press formability.

In this case, when the nickel content in the zinc phosphate-based coating is below 0.1 mass % or the manganese content is below 0.5 mass %, large blisters may occur in the paint in a corrosive environment and therefore such a condition is not preferred in view of compatibility with perforative corrosion resistance. On the other hand, when the nickel content in the zinc phosphate-based coating exceeds 1.4 mass % or the manganese content exceeds 5.0 mass %, it is difficult to incorporate 2.0 mass % or more of magnesium in the zinc phosphate-based coating, and the resulting zinc phosphate crystal becomes less fine and scaly with a longer side of 2.5 μm or more, therefore further improvement in press formability is difficult to obtain.

In the present invention, the coating weight of the zinc phosphate-based coating per side is preferably in the range of 0.5 to 3.0 g/cm$^2$. This is because perforative corrosion resistance after electrodeposition painting and press formability can be sufficiently improved with the coating weight of 0.5 g/cm$^2$ or more. Moreover, the coating weight of the zinc phosphate-based coating provides enough adhesion to the silicone resin-containing coating formed on the zinc phosphate-based coating, which prevents the silicone resin from being dissolved in the chemical conversion treatment process for automobiles. On the other hand, when the coating weight is 3.0 g/cm$^2$ or less, the formation of the coating does not take a long time, thereby lowering the cost and frictional resistance on the surface is decreased to improve the press formability. Furthermore, the coating weight of the zinc phosphate-based coating is more suitably adjusted in the range of 0.5 to 2.0 g/cm$^2$ in view of perforative corrosion resistance after electrodeposition painting and press formability.

Furthermore, a coating which contains a silicone resin which has a functional group which reacts with an organic substance is formed on the surface of the zinc phosphate-based coating in the present invention. This drastically improves perforative corrosion resistance.

It is essential that the above-mentioned silicone resin coating have a functional group which reacts with an organic substance. The reason is that an electrodeposition painting layer (an organic coating) is formed on the silicone resin coating in the manufacturing process of automobiles and therefore it is essential that the silicone resin react with the organic substance in the upper layer, i.e. the paint component, and exhibit excellent adhesion.

Furthermore, adhesion between the silicone resin coating which has a functional group which reacts with an organic substance and the zinc phosphate-based coating is exhibited by the action between the silicate parts and silanol parts in the silicone resin and phosphoric acid residues and adhesion between the organic substance, i.e. the paint, and the silicone resin coating is exhibited by the functional group parts in the silicone resin which react with the paint component.

It is also essential that the above-mentioned silicone resin coating have adhesion to an inorganic substance such as the zinc phosphate-based coating, which is the base of the silicone coating, and the zinc-based plating coating which is exposed through pinholes in the zinc phosphate-based coating. In this connection, the silicate parts (Si—OR, wherein R represents an alkyl group) and the silanol parts (Si—OH) show adhesion to the above-mentioned inorganic substance.

Incidentally, the silicone resin coating which is one component of the coated steel sheets refers to a compound represented by the following formula with n being 2 or more. Namely, the silicone resin is a linear resin formed from siloxane bonds as a main chain which may be partially branched.

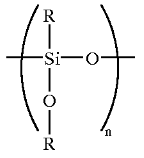

On the other hand, the silane coupling agent which is conventionally used is represented by $R^1$—(Si—O—$R^2$)$_3$, with $R^1$ being a main chain, and has terminal silicates. In this formula, $R^1$ is composed of C—C or C═C and an organic functional group and $R^2$ is an alkyl group. This type of silane coupling agent has a low molecular-weight and poor adhesion to the base, and therefore it is prone to be dissolved in the chemical conversion treatment process of automobiles.

In the present invention, a silicone resin coating which has a functional group which reacts with an organic substance is formed on the zinc phosphate-based coating which contains magnesium.

The silicone resin which has a functional group which reacts with an organic substance of the present invention forms silanol groups (Si—OH) by the reaction with moisture in air and the silanol groups themselves have the effect of substantially improving corrosion resistance of the zinc-based plating coating. At the same time, the silanol groups also improve hydrophilicity to ensure electric conduction during electrodeposition painting. As a result, electrodeposition paintability are also improved.

Furthermore, many hydrogen bonds are formed between the oxygen atoms in the zinc phosphate-based coating and the hydroxyl groups of the silanol groups in the above-mentioned silicone resin coating. At the same time, the silicone resin, in which siloxane bonds (—Si—O—Si—) are linked in a linear or a branched manner, and the zinc phosphate-based coating physically intertwine with each other. As mentioned above, the chemical and physical bonds provide a coating having superior resistance to chemical conversion treatment. Accordingly, the silane coupling agent is conventionally dissolved in the chemical conversion treatment in automobile manufactures but the present invention is free from such a problem.

The silicone resin coating according to the present invention, which has a functional group which reacts with an organic substance, is coated at a coating weight of 0.02 g/m$^2$ or more in order to improve perforative corrosion resistance. When the coating weight is too high, the cost is high and weldability is decreased. Therefore, the coating weight is preferably 0.02 to 3.00 g/m$^2$.

As the functional group of the silicone resin according to the present invention which reacts with an organic substance, there may be mentioned an amino group, a mercapto group, and an isocyanate group, and use of a silicone resin which has one of the functional groups provides superior paint adhesion. In particular, when the functional group which reacts with an organic substance is an amino group, adhesion to an electrodeposition painting formed on the silicone resin coating is superior and the amino group provides hydrophilicity. Therefore enough electric conduction are ensured in electrodeposition painting and a coating which has superior electrodeposition paintability can be obtained.

The silicone resin coating which has a functional group which reacts with an organic substance preferably contains anti-corrosive pigments, lubricating agents, and other organic resins which will be described later. In this case, the silicone resin is preferably incorporated at about 50 to 100 mass % in the coating. When the silicone resin is present at below 50 mass %, sufficient perforative corrosion resistance, paint adhesion, chemical conversion treating properties, and electrodeposition paintability cannot be obtained as mentioned above.

However, the ladder-type silicone resin is preferably excluded because it decreases press formability. The reason is that the ladder-type silicone resin is a silicone resin which has a network structure as shown below and has little room for transformation. Namely, the ladder-type silicone resin is inflexible and therefore cannot follow the deformation of the material in press forming and, on the contrary, restrains the deformation of the material, which makes the material prone to crack. In addition, the ladder-type silicone resin has half or less the silicate parts and silanol parts as compared to the linear or branched resins, which makes paint adhesion and perforative corrosion resistance of zinc-based plating insufficient.

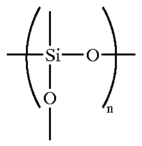

Incidentally, the coated steel sheets according to the present invention which have the silicone resin coating show superior corrosion resistance to coated steel sheets coated with organic resins such as epoxy resins or acrylic-based resins and have enough corrosion resistance without anti-corrosive pigments such as $SiO_2$. Of course, anti-corrosive pigments may be added to the silicone resin-containing coating and lubricating agents and epoxy-based, acrylic-based, or urethane-based organic resins may be further added as necessary.

In particular, when an oxidized polyethylene is added, a steel sheet having extremely superior press formability can be obtained for the reason below.

As mentioned above, the zinc phosphate-based coating retains a lubricant and acts as a buffer between metals to prevent the damage of the zinc-based plated coating by friction. However, press forming methods vary depending on the type of automobiles and parts, and there is a case of so-called oil shortage in which little lubricant is present on the surface of steel sheets when a low-viscosity lubricant is used or press forming is conducted under a high contact pressure.

In such cases, proper press forming is ensured when a silicone resin which contains an oxidized polyethylene is used even if any lubricant is used or press forming is conducted under an extremely high contact pressure.

Figure 5:
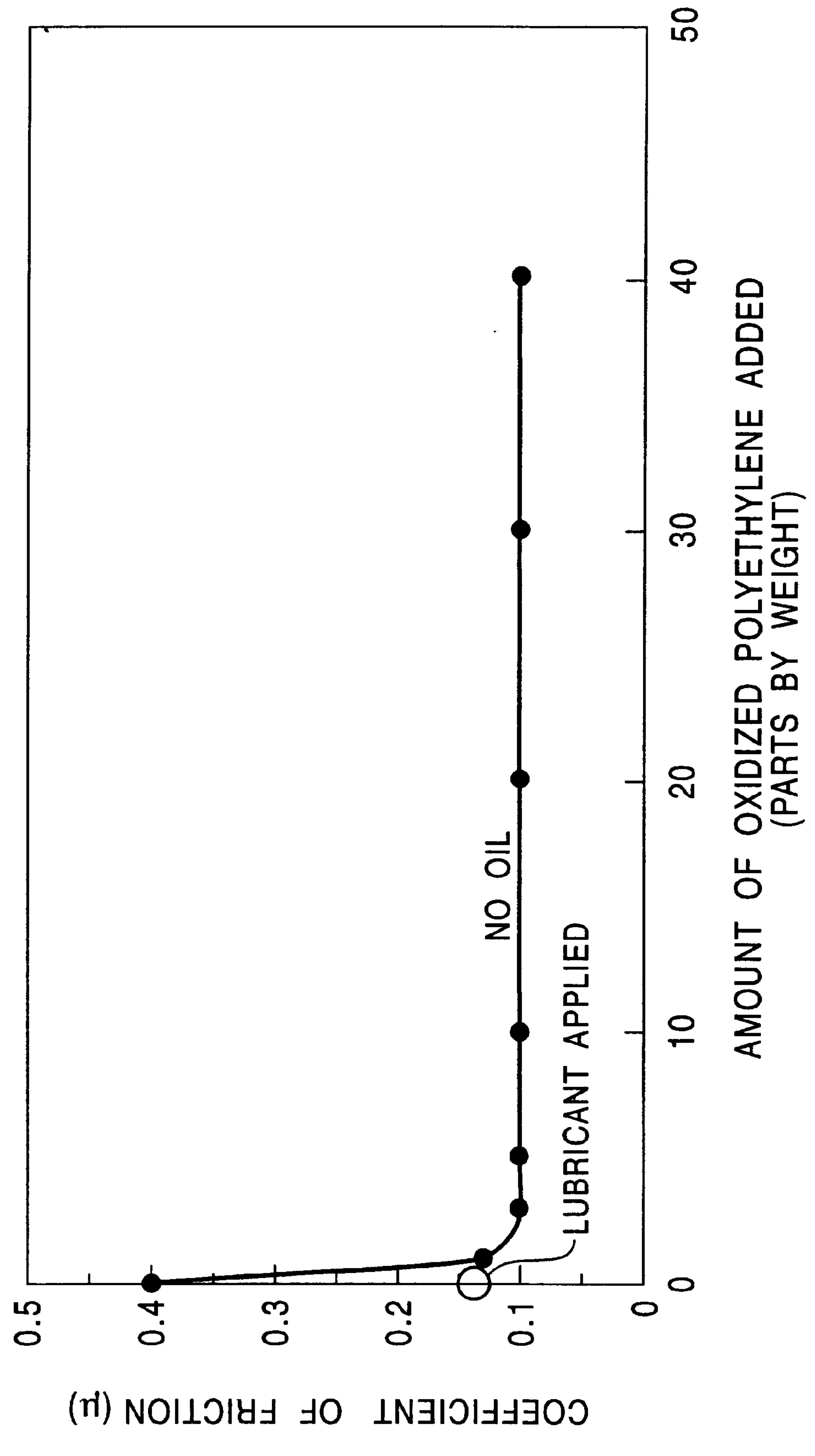
FIG. 5 is a graph which shows planar lubricity of steel sheets with different amounts of oxidized polyethylene in the silicone resin coating when no lubricant is applied.

FIG. 5 shows the results of effects of an oxidized polyethylene added in the silicone resin coating on planar lubricity by using the coated steel sheets of Example 2 of the present invention. The added amount of the oxidized polyethylene is shown with reference to 100 parts by weight of the silicone resin. Each coated steel sheet was solvent degreased before the test to measure planar lubricity of the steel sheet with no oil on the surface. As shown clearly in the figure, the addition of a predetermined amount or more of an oxidized polyethylene provides low coefficient of friction under no oil conditions. Namely, when the silicone resin contains 3 mass % or more of the oxidized polyethylene, it provides low coefficient of friction compared to the case with a lubricant.

Therefore, the oxidized polyethylene is preferably added in 1 to 30 parts by weight, and more preferably 3 to 20 parts by weight with reference to 100 parts by weight of the silicone resin. When the oxidized polyethylene is added at below 1 part by weight, improvement in press formability is not obvious, and when over 30 parts by weight of the oxidized polyethylene is added, further improvement cannot be expected and it only increases the cost.

Incidentally, when the molecular weight of the oxidized polyethylene to be added is low, it tends to decrease adhesion to an electrodeposition painting applied in the manufacturing process of automobiles, therefore an oxidized polyethylene which has a molecular weight of 2,000 or more is more suitably used.

The above description is only an embodiment of the present invention and various changes can be made in Claims.

EXAMPLES

A zinc or zinc alloy plating coating is applied to a 0.7 mm thick cold-rolled steel sheet with the plating method and the coating weight shown in Table 3, and the coating is subjected to normal surface control treatment and a zinc phosphate-based coating is formed on the surface with a zinc phosphate-based treatment liquid shown in Table 1. Subsequently, a silicone resin-containing coating or a silane coupling agent shown in Table 2 is applied on one surface of the zinc phosphate-based coating as the third layer in a coating weight shown in Table 3.

The coated steel sheet thus obtained was subjected to various tests shown below to evaluate various properties.

Perforative Corrosion Resistance (Corrosion Resistance with no Paint)

A sample taken from each coated steel sheet was subjected to the cycle shown below once a day for ten days after baking at 165° C. for 25 minutes and evaluated for the ratio of the area having red rust. The results are graded as ○ where the ratio of the area with red rust is below 50%, Δ where the ratio of the area with red rust is 50% or more and below 100%, and X where the ratio of the area with red rust is 100%.

Salt spray (35° C., 6 hours)→drying (50° C., 3 hours) → humidifying (50° C., 14 hours)→left standing (35° C., 1 hours)

Perforative Corrosion Resistance (Corrosion Resistance After Electrodeposition Painting)

Each coated steel sheet was subjected to a normal alkali degreasing and a surface control treatment according to the manufacturing process of automobiles and then immersed in a phosphate treatment liquid SD2500 (manufactured by Nippon Paint Co., Ltd.) for 2 minutes. Subsequently, the steel sheet was electrodeposition painted with an electrodeposition paint V20 manufactured by Nippon Paint Co., Ltd. (bath temperature: 28 to 30° C.) at an electrodeposition painting voltage of 250 V for an electrifying time of 180 seconds, and was then baked at 165° C. for 20 minutes to form an electrodeposition painting (thickness: 10 $\mu$m). The electrodeposition painted sample was subjected to cross cutting with a knife and subsequently subjected to the composite cycle corrosion resistance test shown below once a day for a hundred days and the maximum corrosion depth was measured to evaluate perforative corrosion resistance after electrodeposition painting.

Salt spray (35° C., 6 hours)→drying (50° C., 3 hours) → humidifying (50° C., 14 hours)→left standing (35° C., 1 hours)

Electrodeposition Paintability

The steel sheet which was subjected to the chemical conversion treatment as mentioned above was immersed in an electrodeposition paint V-20 (bath temperature: 28 to 30° C.) manufactured by Nippon Paint Co., Ltd. and electrodeposition painted at an electrodeposition painting voltage of 250 V for an electrifying time of 180 seconds, and was then baked at 165° C. for 20 minutes. This coated steel sheet was observed for pinhole-like electrodeposition painting defects (pinholes or craters). The results are graded as ○ where no pinhole or crater was observed, Δ where pinholes or craters were present at $1/cm^2$ or more and below $3/cm^2$, and X where pinholes or craters were present at $3/cm^2$ or more.

Paint Adhesion

Paint adhesion was evaluated by a wet adhesion test.

The coated steel sheet, which was subjected to the chemical conversion treatment with SD2500 and electrodeposition painted, was coated with an automobile primary coat OTO-870H (manufactured by Nippon Paint Co., Ltd.) and an automobiles top coat OTO650 (manufactured by Nippon Paint Co., Ltd.), each in a thickness of 40 $\mu$m, and was immersed in pure water at 50° C. for 10 days. The steel sheet was taken out from water and immediately subjected to cross cutting to produce a hundred numbers of 2 mm-square sections with a knife and subjected to tape peeling to count the amount of paint remaining. The results were graded as ○ where 95% to 100% of the paint remained unpeeled, Δ where 85% or more and below 95% of the paint remained unpeeled, and X where below 85% of the paint remained unpeeled.

Press Formability

A. Press Formability when a Lubricant is Coated on the Surface of a Steel Sheet

A steel sheet with one side coated up to the coating with the zinc phosphate-based coating (the second layer) and the other side coated up tp the coating with the silicone resin coating (the third layer) was prepared. A 300 mm-long and 20 mm-wide test piece taken from this steel sheet was coated with a lubricant (detergent oil P 1600 manufactured by Nisseki Mitsubishi Co., Ltd.) at a coating weight of 1.5 $g/m^2$ and subjected to a sliding test under the conditions of a load of 9.8 $N/mm^2$, a withdrawal rate of 80 mm/sec at room temperature with a 10 mm-long and 20 mm-wide long flat contact tool to measure the coefficient of friction. The results were graded as ○ where the coefficient of friction $\mu$ is below 0.12, Δ where the coefficient of friction $\mu$ is 0.12 or more and below 0.15, and X where the coefficient of friction $\mu$ is 0.15 or more.

B. Press Formability when no Oil is Coated on the Surface of a Steel Sheet

A test piece was degreased with n-hexane before the test and subjected to the sliding test as for A without coating a lubricant (press oil). The results were graded as X where the test piece fractured or did not move during the measurement, ○ where the measurement was conducted to give a coefficient of friction over 0.2, and ◎ where the coefficient of friction is 0.2 or less.

Weldability

Continuous spot-welding was conducted by a mixed spot-welding method where various coated steel sheets and a cold-rolled steel sheet were alternately subjected to spot welding every 25 spots under the following conditions. The results were graded as ○ where the number of spots till a button diameter equal to or larger than the tip of the electrode was formed was 500 or more and X where the number of spots was below 500.

(Welding Conditions)

Electrode used: Type-CF×Type-F

Electrode force: 2450 N (250 kgf)

Welding current: current immediately before generation of dust

Squeeze: 35 cycle/60 Hz

Slope: 0

Weld: 14 cycle/60 Hz

Hold: 2 cycle/60 Hz

Amount of cooling water: 3 l/min

TABLE 1

| Zinc phosphate-based treatment solution conditions | |
|---|---|
| $PO_4^{3-}$ | 5 to 30 g/L |
| $Zn^{2+}$ | 0.5 to 3.0 g/L |
| $Ni^{2+}$ | 0.1 to 10.0 g/L |
| $Mn^{2+}$ | 0.3 to 10.0 g/L |
| $Mg^{2+}$ | 3 to 50 g/L |
| $No_3^-$ | 1 to 150 g/L |
| Total fluorine content | 0.1 to 0.8 g/L |
| Treatment temperature | 40 to 60° C. |

TABLE 2

| Type | The third layer coating/ average polymerization degree | Functional group |
|---|---|---|
| A | Linear silicone resin/n = 10 (partially branched) | Amino group |
| B | Linear silicone resin/n = 20 (partially branched) | Mercapto group |
| C | Linear silicone resin/n = 10 | Isocyanate group |
| D | Silane-coupling agent (3-glycidoxypropyltrimethoxysilane) | Epoxy group |
| E | Ladder-type silicone resin/n = 10 | None |
| F | A mixture of 100 parts by weight of the coating A and 10 parts by weight of an oxidized polyethylene (Kusumoto Chemicals, Ltd. SE480-10T) | Amino group |
| G | A mixture of 100 parts by weight of the coating C and 5 parts by weight of an oxidized polyethylene (Kusumoto Chemicals, Ltd. SE1020-7TN) | Isocyanate group |

TABLE 3-1

| | Zinc-based plating | | Zinc phosphate-based coating | | | | | | | |
|---|---|---|---|---|---|---|---|---|---|---|
| | Manufacturing method* | Coating weight ($g/m^2$) | Coating weight ($g/m^2$) | Ni (mass %) | (Ni × 7.6) − 10.9 | Mn (mass %) | Ni × 11.4 | Mg (mass %) | Zinc phosphate crystalline Shape | Zinc phosphate crystalline Size ($\mu m$) |
| Example 1 | a | 23 | 1.5 | 0.8 | −4.82 | 3.2 | 9.12 | 3.5 | Granular | 1.3 |
| Example 2 | a | 30 | 2.0 | 1.2 | −1.78 | 3.6 | 13.68 | 3.8 | Granular | 1.3 |
| Example 3 | b | 45 | 1.8 | 1.9 | 3.54 | 7.9 | 21.66 | 0.6 | Scaly | 2.8 |
| Example 4 | b | 58 | 2.2 | 0.6 | −6.34 | 6.8 | 6.84 | 2.7 | Granular | 2.2 |
| Example 5 | a | 30 | 0.5 | 0.7 | −5.58 | 3.1 | 7.98 | 9.5 | Granular | 1.1 |
| Example 6 | b | 45 | 2.9 | 1.0 | −3.30 | 4.5 | 11.40 | 4.6 | Granular | 1.2 |
| Example 7 | a | 23 | 0.7 | 0.6 | −6.34 | 4.0 | 6.84 | 0.6 | Scaly | 2.9 |
| Example 8 | b | 45 | 2.8 | 1.8 | 2.78 | 5.0 | 20.52 | 5.5 | Granular | 1.2 |
| Example 9 | a | 30 | 1.0 | 1.5 | 0.50 | 3.5 | 17.10 | 3.8 | Granular | 1.3 |
| Example 10 | b | 58 | 1.2 | 2.0 | 4.30 | 5.0 | 22.80 | 2.7 | Granular | 2.2 |
| Example 11 | a | 30 | 1.5 | 0.4 | −7.86 | 8.5 | 4.56 | 3.8 | Granular | 1.3 |
| Example 12 | b | 58 | 2.2 | 1.0 | −3.30 | 1.0 | 11.40 | 5.5 | Granular | 1.2 |
| Example 13 | a | 30 | 2.0 | 0 | −10.90 | 8.2 | 0 | 0.2 | Scaly | 3.1 |
| Example 14 | a | 30 | 1.0 | 0.3 | −8.62 | 1.0 | 3.42 | 2.0 | Granular | 2.4 |
| Example 15 | b | 45 | 0.7 | 0 | −10.90 | 0 | 0 | 8.0 | Granular | 1.1 |
| Example 16 | a | 30 | 1.0 | 1.2 | −1.78 | 3.6 | 13.68 | 3.8 | Granular | 1.3 |
| Example 17 | a | 30 | 1.0 | 1.2 | −1.78 | 3.6 | 13.60 | 3.8 | Granular | 1.3 |
| Comp. ex. 1 | b | 45 | 1.5 | 0.8 | −4.82 | 3.2 | 9.12 | 0 | Scaly | 3.8 |
| Comp. ex. 2 | b | 45 | 1.8 | 1.7 | 2.02 | 1.9 | 19.38 | 0 | Scaly | 3.8 |
| Comp. ex. 3 | c | 45 | | | | | None | | | |
| Comp. ex. 4 | a | 30 | | | | | None | | | |
| Comp. ex. 5 | b | 58 | | | | | None | | | |
| Comp. ex. 6 | a | 30 | 1.0 | 1.0 | −3.30 | 4.0 | 11.40 | 1.5 | Scaly | 2.6 |

*Manufacturing method
a Electrogalvanizing,
b Hot-dip galvanizing,
c Hot-dip galvanealing (Zn: Fe = 90:10 mass %)

TABLE 3-2a

| | Silicone resin coating | | Evaluation of characteristics | | | | | | |
|---|---|---|---|---|---|---|---|---|---|
| | Coating solution | Coating weight ($g/m^2$) | Perforative corrosion resistance after electrodeposition painting (mm) | Perforative corrosion resistance in unpainted portion | electrodeposition paintability | Adhesion of paint | Press formability Lubricant applied | Press formability No oil | Weldability |
| Example 1 | A | 1.00 | 0.08 | ○ | ○ | ○ | ○ | ○ | ○ |
| Example 2 | A | 0.50 | 0.10 | ○ | ○ | ○ | ○ | ○ | ○ |
| Example 3 | A | 0.50 | 0.15 | ○ | ○ | ○ | ○ | ○ | ○ |
| Example 4 | A | 0.10 | 0.18 | ○ | ○ | ○ | ○ | ○ | ○ |
| Example 5 | B | 0.20 | 0.05 | ○ | ○ | ○ | ○ | ○ | ○ |
| Example 6 | B | 0.30 | 0.10 | ○ | ○ | ○ | ○ | ○ | ○ |
| Example 7 | B | 2.80 | 0.18 | ○ | ○ | ○ | ○ | ○ | ○ |
| Example 8 | C | 2.00 | 0.06 | ○ | ○ | ○ | ○ | ○ | ○ |
| Example 9 | C | 0.80 | 0.05 | ○ | ○ | ○ | ○ | ○ | ○ |
| Example 10 | C | 0.03 | 0.10 | ○ | ○ | ○ | ○ | ○ | ○ |
| Example 11 | A | 0.30 | 0.39 | ○ | ○ | ○ | ○ | ○ | ○ |
| Example 12 | B | 0.80 | 0.32 | ○ | ○ | ○ | ○ | ○ | ○ |
| Example 13 | C | 0.10 | 0.44 | ○ | ○ | ○ | ○ | ○ | ○ |
| Example 14 | B | 0.80 | 0.31 | ○ | ○ | ○ | ○ | ○ | ○ |
| Example 15 | B | 1.50 | 0.40 | ○ | ○ | ○ | ○ | ○ | ○ |
| Example 16 | F | 0.50 | 0.10 | ○ | ○ | ○ | ○ | ◎ | ○ |
| Example 17 | G | 0.30 | 0.15 | ○ | ○ | ○ | ○ | ◎ | ○ |
| Com. ex. 1 | C | 0.30 | 0.55 | ○ | ○ | ○ | ○ | ○ | ○ |
| Com. ex. 2 | E | 0.03 | 0.53 | Δ | ○ | ○ | x | x | ○ |

TABLE 3-2b

| | Silicone resin coating | | Evaluation of characteristics | | | | | | |
|---|---|---|---|---|---|---|---|---|---|
| | | | Perforative corrosion resistance after electrodeposition painting (mm) | Perforative corrosion resistance in unpainted portion | electrodeposition paintability | Adhesion of paint | Press formability | | Weldability |
| | Coating solution | Coating weight (g/m$^2$) | | | | | Lubricant applied | No oil | |
| Com. ex. 3 | None | — | 0.58 | x | x | ○ | x | ○ | ○ |
| Com. ex. 4 | None | — | 0.58 | x | ○ | ○ | x | x | x |
| Com. ex. 5 | C | 0.20 | 0.52 | Δ | ○ | x | x | x | x |
| Com. ex. 6 | D | 0.40 | 0.42 | Δ | ○ | x | ○ | ○ | ○ |

Industrial Applicability

The present invention enabled coated steel sheets having superior perforative corrosion resistance, paint adhesion, electrodeposition paintability, press formability, and weldability to be manufactured at low cost.

What is claimed is:

1. A coated steel sheet comprising:

a steel sheet;

a zinc-based plating layer formed on at least one surface of the steel sheet;

a zinc phosphate-based coating containing magnesium formed on the zinc-based plating layer; and a silicone resin coating containing at least one functional group selected from the group consisting of amino groups, mercapto groups and isocyanate groups on the surface of the zinc phosphate-based coating.

2. A coated steel sheet according to claim 1 wherein the zinc phosphate-based coating further contains nickel and manganese.

3. A coated steel sheet according to claim 2 wherein the zinc phosphate-based coating contains 0.5 to 10.0 mass % of magnesium, 0.1 to 2.0 mass % of nickel, and 0.5 to 8.0 mass % of manganese and the manganese and nickel contents satisfy the following formula (1):

$$[Ni]\times 7.6-10.9 \leqq [Mn] \leqq [Ni]\times 11.4 \quad (1)$$

wherein [Mn] represents the mass % of manganese and [Ni] represents the mass % of nickel.

4. A coated steel sheet according to claim 3 wherein the zinc phosphate-based coating contains 2.0 to 7.0 mass % of magnesium, 0.1 to 1.4 mass % of nickel, and 0.5 to 5.0 mass % of manganese.

5. A coated steel sheet according to claim 4 wherein zinc phosphate is a granular crystal with a longer side below 2.5 $\mu$m in the zinc phosphate-based coating.

6. A coated steel sheet according to claim 1 wherein the silicone resin coating further contains an oxidized polyethylene.

* * * * *